(12) United States Patent
Hsieh et al.

(10) Patent No.: US 10,099,512 B2
(45) Date of Patent: Oct. 16, 2018

(54) UNIVERSAL ROTATING MODULE

(71) Applicant: ASUSTeK COMPUTER INC., Taipei (TW)

(72) Inventors: Chang-Ru Hsieh, Taipei (TW); Li-Wei Yu, Taipei (TW); Chang-Hung Chen, Taipei (TW); Chih-Hung Chuang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/439,954

(22) Filed: Feb. 23, 2017

(65) Prior Publication Data

US 2017/0253082 A1 Sep. 7, 2017

(30) Foreign Application Priority Data

Mar. 7, 2016 (TW) .............................. 105106825 A

(51) Int. Cl.
*B60B 33/08* (2006.01)
*B60B 33/04* (2006.01)
(Continued)

(52) U.S. Cl.
CPC ........ *B60B 33/045* (2013.01); *B60B 33/0063* (2013.01); *B60B 33/08* (2013.01); *B60B 19/003* (2013.01); *B60B 2200/20* (2013.01); *B60B 2200/22* (2013.01); *B60B 2900/531* (2013.01); *B60B 2900/551* (2013.01)

(58) Field of Classification Search
CPC ..... Y10T 16/188; Y10T 16/218; B60B 33/08; B60B 33/001; B60B 33/0018; B60B 33/0002; B60B 33/0005; B60B 33/0044; B60B 33/0028; B60B 33/045; B60B 33/0063; B60B 19/003; B60B 2200/20; B60B 2200/22; B60B 2900/531; B62B 301/252; B62B 5/0083; B62B 2301/252; A45C 5/14; A45C 5/143; A45C 5/142
See application file for complete search history.

(56) References Cited

U.S. PATENT DOCUMENTS 2,490,879 A * 12/1949 Milich .................... B60B 33/08
                                                                  16/26
2,915,776 A * 12/1959 Hanson ................. B60B 33/045
                                                                  16/21
(Continued)

FOREIGN PATENT DOCUMENTS

CN          201934498          8/2011
CN          102962673          3/2013
(Continued)

*Primary Examiner* — Chuck Y Mah
(74) *Attorney, Agent, or Firm* — JCIPRNET

(57) ABSTRACT

A universal rotating module is provided. The universal rotating module comprises a suspension carrier, a top cover, a globular element, and a plurality of cushion members. The suspension carrier includes a through hole and a plurality of first fixing portions beside the through hole. The top cover includes a plurality of second fixing portions. The globular element is disposed between the suspension carrier and the top cover. A portion of the globular element passes through the through hole. Each of the cushion members is correspondingly connected with the first fixing portion and the second fixing portion.

10 Claims, 4 Drawing Sheets

(51) Int. Cl.
  *B60B 33/00*    (2006.01)
  *B60B 19/00*    (2006.01)

(56) References Cited

U.S. PATENT DOCUMENTS

| | | | | |
|---|---|---|---|---|
| 3,132,904 | A | * | 5/1964 | Wakamatsu ......... B65G 39/025 16/26 |
| 3,739,894 | A | * | 6/1973 | Hinman ................... B65G 7/04 16/26 |
| 3,920,290 | A | * | 11/1975 | Evarts ................. B65G 39/025 16/26 |
| 4,203,177 | A | * | 5/1980 | Kegg ...................... B60B 33/08 16/24 |
| 4,402,108 | A | * | 9/1983 | Pannwitz ................ B60B 33/08 16/26 |
| 4,696,583 | A | * | 9/1987 | Gorges ................... B60B 33/08 16/26 |
| 4,871,052 | A | * | 10/1989 | Huber .................... B60B 33/08 16/26 |
| 5,219,058 | A | * | 6/1993 | Sundseth ............. B65G 39/025 16/26 |
| 5,694,662 | A | * | 12/1997 | Bordeleau ............... B60B 33/08 16/25 |
| 6,134,747 | A | * | 10/2000 | Leibman ............. B60B 33/0002 16/24 |
| 8,635,960 | B2 | * | 1/2014 | Iguchi .................. F16C 29/046 108/139 |
| 2017/0021668 | A1 | | 1/2017 | Zhao et al. |

FOREIGN PATENT DOCUMENTS

| | | |
|---|---|---|
| CN | 203789496 | 8/2014 |
| CN | 104972833 | 10/2015 |

\* cited by examiner

UNIVERSAL ROTATING MODULE

CROSS-REFERENCE TO RELATED APPLICATION

This application claims the priority benefit of TW application serial No. 105106825, filed on Mar. 7, 2016. The entirety of the above-mentioned patent application is hereby incorporated by references herein and made a part of specification.

BACKGROUND OF THE INVENTION

Field of the Invention

The disclosure relates to a rotating module and, more specifically, to a universal rotating module.

Description of the Related Art

FIG. 1 is a schematic diagram showing a conventional rotating module. Please refer to FIG. 1, a rotating module 10 includes a fixing base 12, a supporting frame 14, a rolling wheel 16 and a plurality of globular element bearings 18. The rolling wheel 16 is pivotally connected to the supporting frame 14. The supporting frame 14 is pivotally connected to the fixing base 12. The globular element bearings 18 are disposed between the supporting frame 14 and the fixing base 12 to make smooth rotations between the supporting frame 14 and the fixing base 12. The fixing base 12 can be fixed to an object, such as a chair and a desk (not shown) to make the object rotate or move.

Since the conventional rotating module 10 has a rotation radius when changing its motion direction, the rotating module 10 may collide with some articles nearby and deviate from a predetermined path, which is a poor usage experience.

BRIEF SUMMARY OF THE INVENTION

According to an aspect of the disclosure, a universal rotating module is provided. The universal rotating module comprises a suspension carrier, a top cover, a globular element, and a plurality of cushion members. The suspension carrier includes a through hole and a plurality of first fixing portions beside the through hole. The top cover includes a plurality of second fixing portions. The globular element is disposed between the suspension carrier and the top cover. A portion of the globular element passes through the through hole. Each of the cushion members is correspondingly connected with the first fixing portion and the second fixing portion.

In sum, in embodiments of the universal rotating module, the globular element displaces the rolling wheel, the globular element bearings and the relevant pivot structure of a conventional rotating module. The direction of the gravity of the universal rotating module and the direction of the normal force against the universal rotating module from the ground pass through the same point, that is the contact position between the globular element and the ground, and thus the universal rotating module would not deviate from the predetermined path when changing its motion direction.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

In an embodiment, a simple universal rotating module capable of rotating in any direction is provided. The universal rotating module would not deviate from a predetermined path when changing its motion direction. Furthermore, it is convenient to assemble, disassemble and clean the universal rotating module. Details are described hereinafter.

Figure 2:
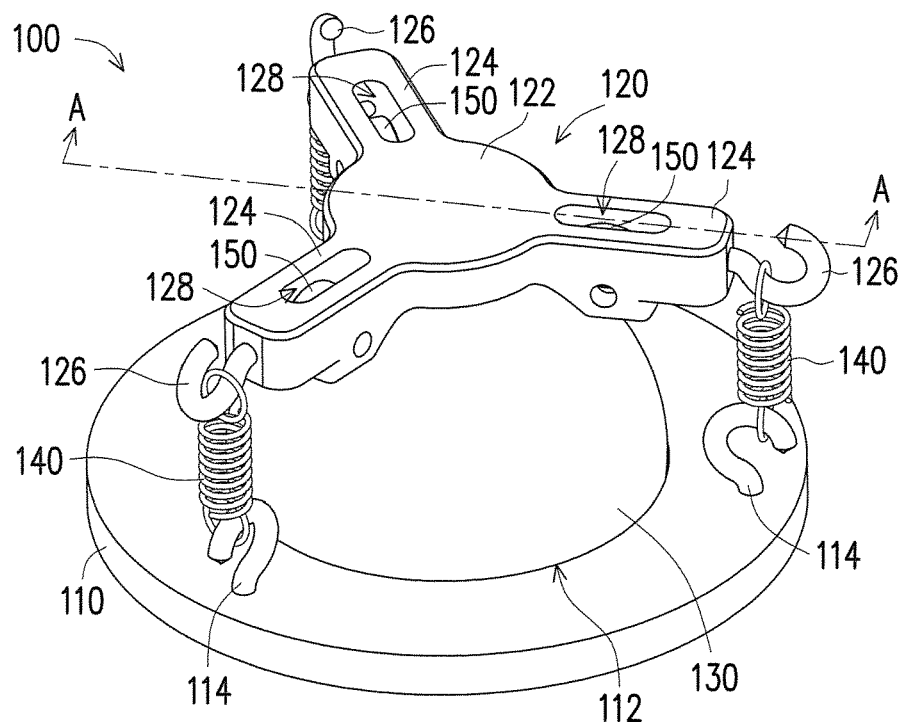
FIG. 2 is a schematic diagram showing a universal rotating module in an embodiment.
Figure 3:
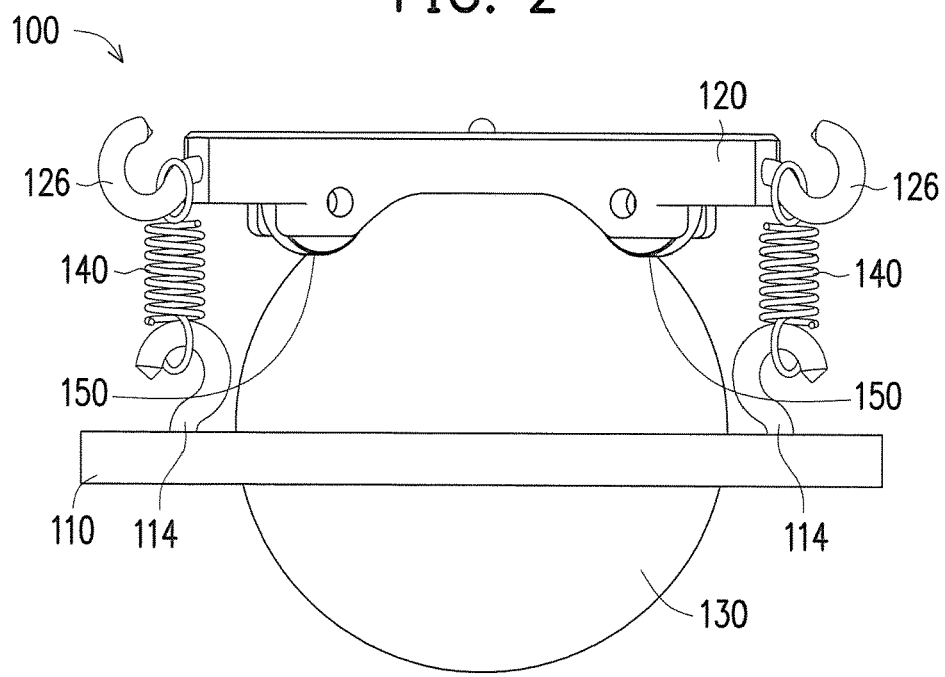
FIG. 3 is a schematic diagram showing the universal rotating module in FIG. 2 from a different view.
Figure 4:
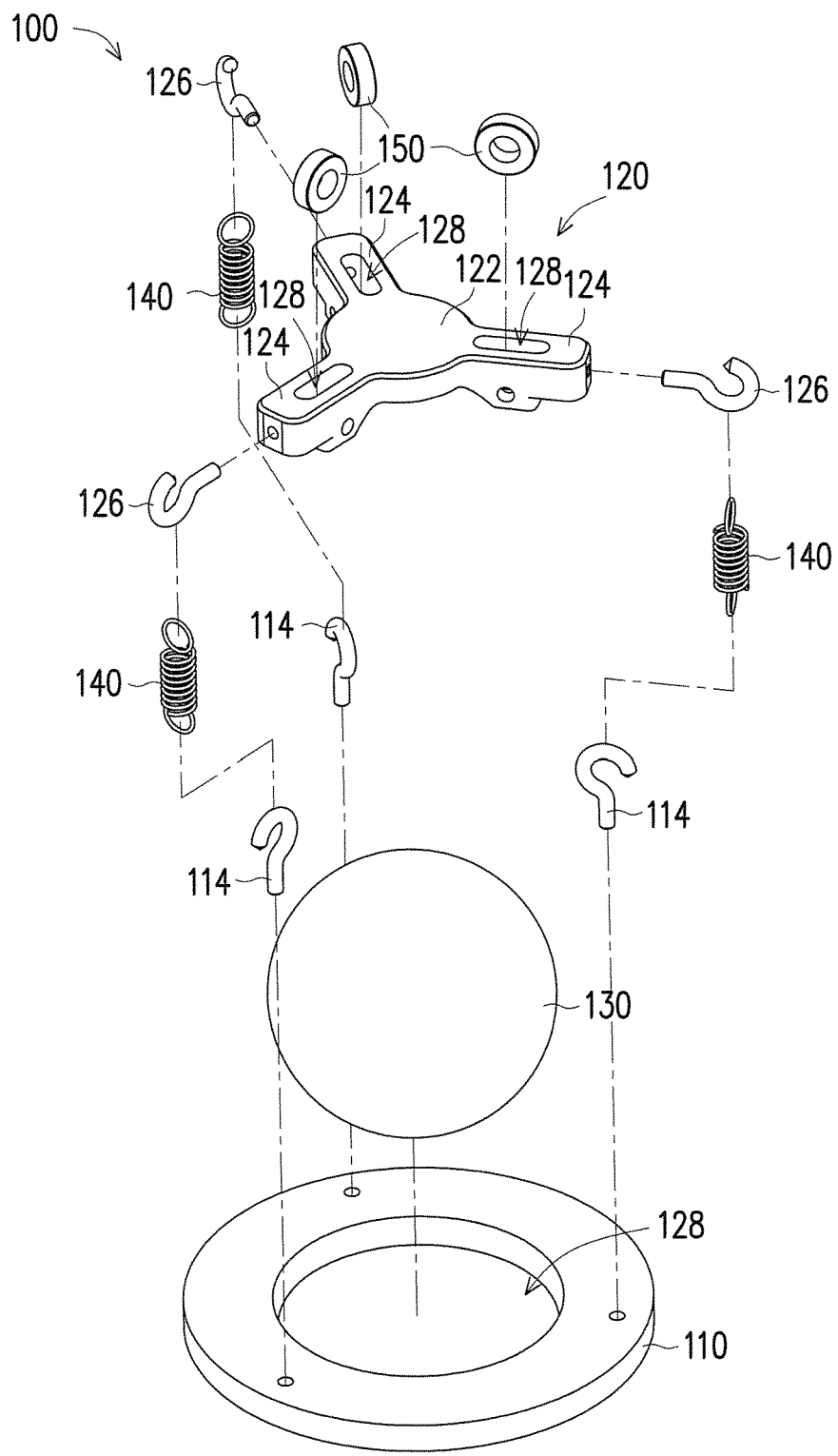
FIG. 4 is an exploded view of the universal rotating module in FIG. 2.
Figure 5:
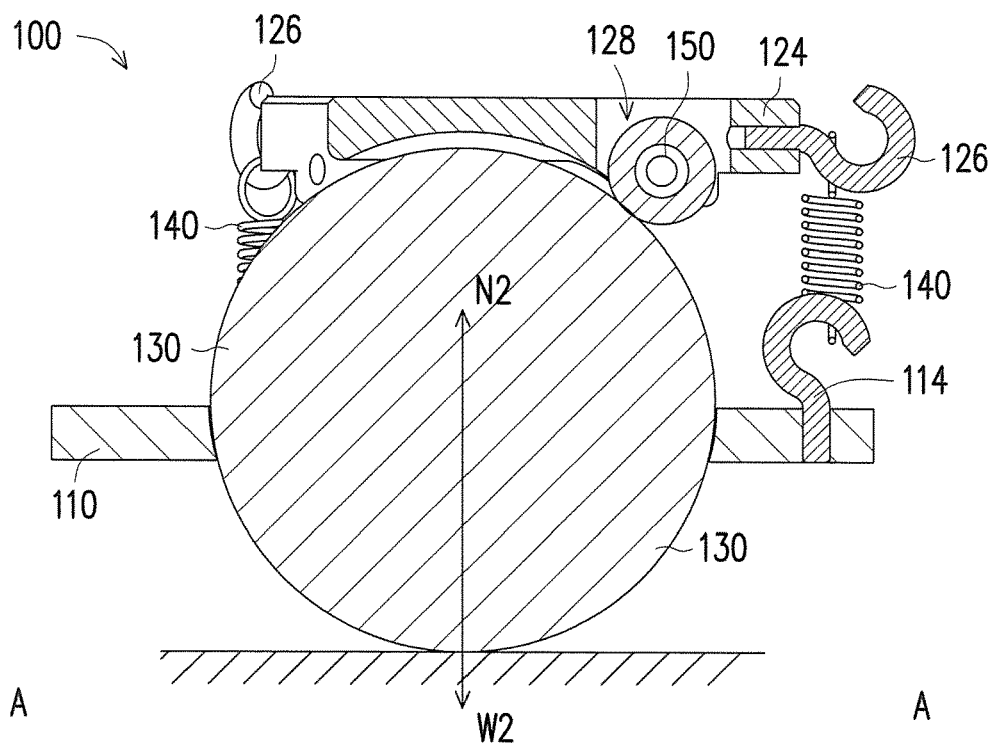
FIG. 5 is a section view of the universal rotating module along line A-A in FIG. 2.
Figure 6:
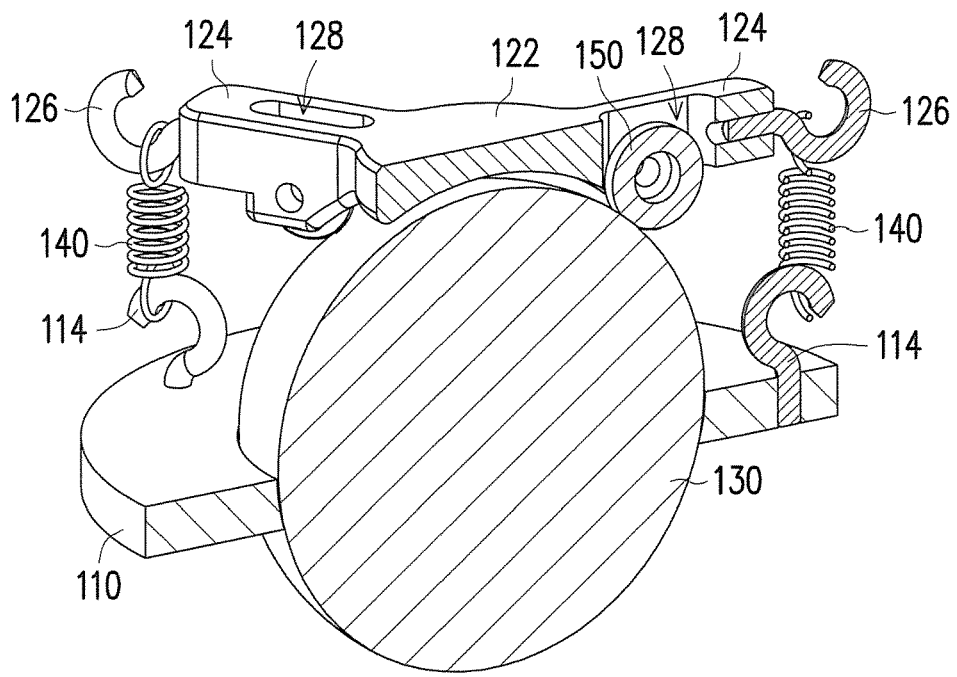
FIG. 6 is a perspective view of the universal rotating module along line A-A in FIG. 2.

FIG. 2 is a schematic diagram showing a universal rotating module in an embodiment. FIG. 3 is a schematic diagram showing the universal rotating module in FIG. 2 from a different view. FIG. 4 is an exploded view of the universal rotating module in FIG. 2. FIG. 5 is a section view of the universal rotating module along line A-A in FIG. 2. FIG. 6 is a perspective view of the universal rotating module along line A-A in FIG. 2. Please refer to FIG. 2 to FIG. 6, in an embodiment, a universal rotating module 100 includes a suspension carrier 110, a top cover 120, a globular element 130, a plurality of cushion members 140 and a plurality of accessory members 150.

The suspension carrier 110 includes a through hole 112 and a plurality of first fixing portions 114 beside the through hole 112. In the embodiment, the number of the cushion members 140 is three, and the number of the first fixing portions 114 of the suspension earlier 110 is also three. Any two of the three first fixing portions 114 are positioned on the suspension carrier 110 symmetrically, and distances between any two adjacent first fixing portions 114 are the same. In other words, the three first fixing portions 114 are located at three vertexes of a regular triangle, respectively. In an embodiment, the number of the first fixing portions 114 of the suspension carrier 110 is four or more, and the first fixing portions 114 are located at the vertexes of the corresponding regular polygon, respectively. In other embodiments, the number of the first fixing portions 114 of the suspension carrier 110 is variable, which is not limited herein.

The top cover 120 includes a central portion 122, a plurality of antis 124 extending from the central portion 122, a plurality of second fixing portions 126 and a plurality of openings 128. In the embodiment, the number of the arms 124 and the number of the second fixing portions 126 correspond to that of the first fixing portions 114, respectively. That is, in the embodiment, both the number of the arms 124 and the number of the second fixing portions 126 are three. Angles between any two adjacent arms 124 are the same. In the embodiment, the angles between any two adjacent anus 124 are 120 degrees. In an embodiment, the number of the anus 124 is four, and the angles between any two adjacent arms 124 are 90 degrees.

In the embodiment, the second fixing portion 126 protrudes from the corresponding arm 124. The distances between any two second fixing portions 126 are the same. Thus, the second fixing portions 126 are located at three vertexes of a regular triangle, respectively. In the embodiment, the regular triangle formed by the three first fixing portions 114 is the same size as the regular triangle formed by the three second fixing portions 126, that is, the three second fixing portions 126 are located right above the three first fixing portions 114, respectively.

In the embodiment, the number of the openings 128 is three. The three openings 128 are formed on the three arms 124, respectively. In other embodiments, the number of the openings 128 is variable, which is not limited herein. In an embodiment, the top cover 120 is shaped like a disk (or other shapes) without the protruding arms 124.

The globular element 130 is disposed between the suspension miler 110 and the top cover 120, and a portion of the globular element 130 passes through the through hole 112. In the embodiment, the diameter of the globular element 130 is larger than that of the through hole 112, and thus the globular element 130 would not wholly pass out of the through hole 112 of the suspension carrier 110. In an embodiment, an object (not shown) is disposed on the suspension carrier 110 in the practical use, and the center of gravity of the suspension carrier 110 is lowered due to the weight of the object, and thus the wall of the suspension carrier 110 surrounding the through hole 112 is separate from the globular element 130 to avoid interference due to frictions between the suspension carrier 110 and the globular element 130.

However, in the embodiment, if a portion of the globular element 130 below the suspension carrier 110 is not high enough, when the universal rotating module 100 supports a heavy object, the suspension carrier 110 may descends to contact with the ground, and then the universal rotating module 100 would be restricted due to the friction from the ground. Therefore, in the embodiment, the diameter of the through hole 112 is more than one half of the diameter of the globular element 130 and the suspension carrier 110 is pulled up by the cushion members 140, thus, the height of the portion of the globular element 130 below the suspension carrier 110 is sufficient for the rotation of the globular element 130.

In the embodiment, the number of the cushion member 140 corresponds to the number of the first fixing portions 114 and the number of second fixing portions 126. The number of the cushion members 140 is three in the embodiment. The cushion member 140 is correspondingly connected to the first fixing portion 114 and the second fixing portion 126. In the embodiment, the cushion member 140 is a spring, and both the first fixing portion 114 and the second fixing portion 126 are hooks. Two ends of the spring are hooked by the hooks. That is, the cushion members 140 is correspondingly hooked to the first fixing portion 114 and second fixing portion 126 detachably. In the embodiment, in the universal rotating module 100, the distance between the suspension carrier 100 and the top cover 120 is variable via the cushion member 140.

In an embodiment, the cushion member 140 is correspondingly fixed to the first fixing portion 114 and the second fixing portion 126 non-detachably. In an embodiment, the cushion member 140 is a pneumatic cylinder for changing the distance between the suspension carrier 100 and the top cover 120. In other embodiments, the type of the cushion member 140 is not limited herein, only if the distance between the suspension carrier 110 and the top cover 120 is adjusted via the cushion member 140.

In the embodiment, the accessory members 150 are rollers or bearings, which is not limited herein. The number of the accessory members 150 corresponds to the number of the openings 128. In the embodiment, the three accessory members 150 are disposed in the openings 128, respectively. The accessory member 150 is pivotally connected to a portion of the corresponding arm 124 which is close to the opening 128, and partial of the accessory member 150 is exposed out of the opening 128. In the embodiment, the accessory members 150 contact with the globular element 130 to facilitate the rotation of the globular element 130.

Compared with a conventional rolling wheel 16 of a rotating module 10 that can only move clockwise or counterclockwise, the universal rotating module 100 in the embodiment is capable of rotating universally, multi-directional and freely via the rotation of the globular element 130.

Figure 1:
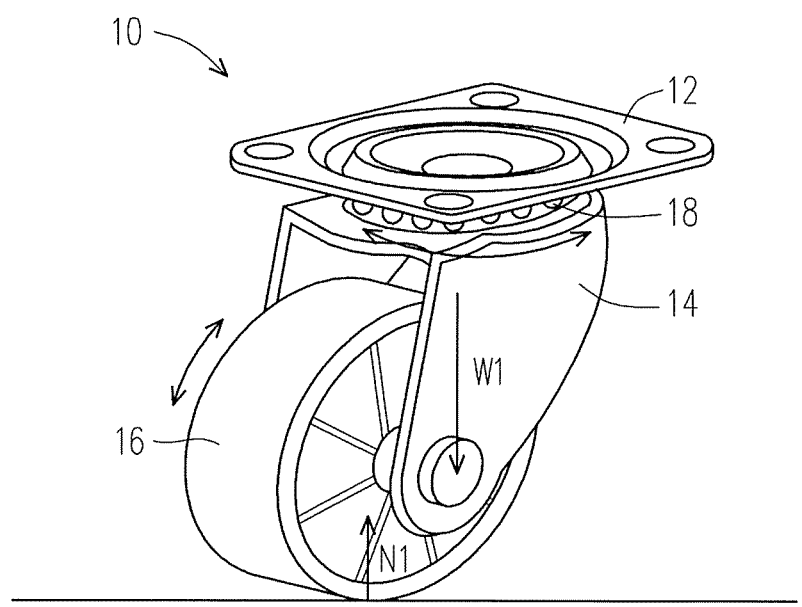
FIG. 1 is a schematic diagram showing a conventional rotating module.

As shown in FIG. 1, since the gravity W1 of the object and the conventional rotating module 10 lies in an axis of the fixing base 12, a normal force N1, which is applied on the rotating module 10 and the object on the rotating module 10, from the ground passes the contact position between the rolling wheel 16 and the ground. In such a way, the conventional rotating module 10 has a rotation radius when changing the motion direction, which easily leads to a deviation. The annular rolling wheel 16 is easily deformed to be oval due to the arm of the gravity W1. When the rotating module 10 and the object stop moving, with the position that the rolling wheel 16 contacts with the ground as a fulcrum, the object may easily turn over due to the arm of the gravity W1.

As shown in FIG. 5, in an embodiment, the direction of the average gravity W2 and that of the average normal force N2 of the universal rotating module 100 and the object (not shown) supported thereon pass through the same point (fulcrum). That is, the universal rotating module 100 does not have the rotation radius while the universal rotating module 100 changes its direction, and thus it can change the motion direction instantly. Therefore, the universal rotating module 100 would not deviate from the predetermined path when changing the motion direction, and thus it would not mistakenly collide with the articles nearby. Additionally, since the average gravity W2 of the universal rotating module 100 and the object (not shown) supported thereon has no arm of the force, the universal rotating module 100 would not turn over due to the gravity W2 in a static state.

In the embodiment, when the universal rotating module 100 passes an obstacle, the globular element 130 hit the obstacle to generate a counterforce. The counterforce transmits onto the cushion members 140 indirectly via the accessory members 150, and then the cushion members 140 are pulled up, and the globular element 130 moves upwards to climb the obstacle. After the globular element 130 climbs the obstacle, the cushion member 140 provides a drawing force to pull the globular element 130 back.

In the embodiment, the globular element 130 of the universal rotating module 100 is made of metal materials with good rigidity, and therefore the globular element 130 does not deform easily.

Furthermore, the conventional rotating module 10 is configured without a shock absorber. In the embodiments, the suspension carrier 110 of the universal rotating module 100 is suspended in the air, the object is disposed on the suspension carrier 110 to reduce the shock.

Moreover, when the rotating module 10 without the brake function is un-loaded, the conventional rotating module 10 easily slides on a sloping terrain or in an earthquake. In the embodiments, the suspension carrier 110 of the universal rotating module 100 is pulled up by the cushion member 140 when the universal rotating module 110 is unloaded, and thus the wall of the suspension carrier 110 surrounding the through hole 112 contacts with the globular element 130 to make the rotating module brake.

Additionally, in the embodiment, when the universal rotating module 100 stops suddenly, the cushion members 140 can be used to buffer against the inertia force of the supported object (not shown) along the motion direction to prevent the object from turning over.

In addition, a special tool is needed to rivet the conventional rotating module 10 in assembling, and a plurality of the globular element bearings 18 needs to be mounted manually. Therefore, it is not easy to assemble the conventional rotating module 10 rapidly, and it is also not easy to disassemble the rolling wheel 16 for cleaning. The rolling wheel 16 of the conventional rotating module 10 has a center shaft and side grooves where dirt are easily accumulated thereon, which makes it difficult to disassemble and clean the rolling wheel 16. In the embodiment, the globular element 130 of the universal rotating module 100 is configured without the grooves, and thus dirt is not easily accumulated therein. In the embodiment, the universal rotating module 100 is detachably installed via the cushion members 140, and thus it is convenient to clean the globular element 130 by disassembling any one of the cushion members 140.

In sum, in the universal rotating module in embodiments, the globular element displaces the rolling wheel, the globular element bearing and the relevant pivot structure of a conventional rotating module. The direction of the gravity of the universal rotating module and the direction of the normal force from the ground pass through the same point, that is the contact position between the globular element and the ground, and thus the universal rotating module would not deviate from the predetermined path when changing the motion direction.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A universal rotating module, comprising:
   a suspension carrier including a through hole and a plurality of first fixing portions beside the through hole;
   a top cover including a plurality of second fixing portions;
   a globular element rotatably disposed between the suspension carrier and the top cover, wherein a portion of the globular element passes through the through hole; and
   a plurality of cushion members, wherein each of the cushion members is correspondingly connected with the first fixing portion and the second fixing portion,
   wherein an orthogonal projection of the through hole overlaps the top cover.

2. The universal rotating module according to claim 1, further comprising:
   a plurality of accessory members pivotally connected to the top cover and contacting with the globular element.

3. The universal rotating module according to claim 2, wherein the top cover includes a plurality of openings, the accessory members are located in the openings, and partial of the accessory members exposed out of the openings contact with the globular element.

4. The universal rotating module according to claim 1, wherein a diameter of the globular element is larger than the diameter of the through hole.

5. The universal rotating module according to claim 1, wherein a diameter of the through hole is more than one half of the diameter of the globular element.

6. The universal rotating module according to claim 1, wherein distances between any two adjacent first fixing portions are the same, and the distances between any two adjacent second fixing portions are the same.

7. The universal rotating module according to claim 1, wherein the top cover includes a central portion and a plurality of arms extending from the central portion, angles between any two adjacent arms are the same, and the second fixing portions are located on the arms, respectively.

8. The universal rotating module according to claim 1, wherein the each of cushion member is a spring or a pneumatic cylinder.

9. The universal rotating module according to claim 1, wherein each of the cushion members is detachably fixed to the first fixing portion and the second fixing portion correspondingly.

10. The universal rotating module according to claim 1, wherein the first fixing portions and the second fixing portions are hooks, and each of the cushion members is detachably hooked to the first fixing portion and the second fixing portion correspondingly.

* * * * *